(12) United States Patent
Wacker et al.

(10) Patent No.: US 12,386,800 B1
(45) Date of Patent: Aug. 12, 2025

(54) SYSTEM AND METHOD FOR USING AN ARTIFICIAL INTELLIGENCE (AI) MODEL TO ROUTE DATA

(71) Applicant: Optum, Inc., Minnetonka, MN (US)

(72) Inventors: Aaron C. Wacker, Mound, MN (US); Sarah Jean Scott, Brentwood, NH (US); Nithya Sundararajan, East Brunswick, NJ (US); Bryan W. Stearns, Saint Peters, MO (US); Sameer Gotkhindikar, Morrisville, NC (US); Matthew R. Versaggi, Plymouth, MN (US); Michael S. Oneil, Minneapolis, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/817,704

(22) Filed: Aug. 28, 2024

(51) Int. Cl.
*G06F 16/215* (2019.01)
*G06F 16/2457* (2019.01)

(52) U.S. Cl.
CPC ...... *G06F 16/215* (2019.01); *G06F 16/24578* (2019.01)

(58) Field of Classification Search
CPC .......... G06F 16/215; G06F 16/24578
See application file for complete search history.

(56) References Cited

U.S. PATENT DOCUMENTS

| 8,650,044 | B2 | 2/2014 | Hasan et al. | |
|---|---|---|---|---|
| 10,872,684 | B2 | 12/2020 | McNutt et al. | |
| 10,915,948 | B1* | 2/2021 | Fontana | G06Q 10/10 |
| 11,270,380 | B1* | 3/2022 | Katschinski | G06Q 40/04 |
| 11,449,793 | B2 | 9/2022 | Neumann | |
| 2014/0089619 | A1* | 3/2014 | Khanna | G06F 3/0652 |
| | | | | 711/166 |

OTHER PUBLICATIONS

Liu, Yiming, et al. "Sketch and Match: Scene Montage Using a Huge Image Collection." (2009). (Year: 2009).*

* cited by examiner

*Primary Examiner* — Jay A Morrison
(74) *Attorney, Agent, or Firm* — Bookoff McAndrews, PLLC

(57) ABSTRACT

Systems and methods for routing data using an artificial intelligence (AI) model are disclosed. The method includes receiving a data request associated with one or more data gaps, determining, by an AI model, a plurality of ranking values for a plurality of candidate data sources respectively based on one or more attributes, each of the plurality of ranking values indicative of a likelihood of filling the one or more data gaps associated with the data request; and routing, over a network, the data request to a first candidate data source of the plurality of candidate data sources based on a first ranking value of the plurality of ranking values; and blocking routing of the data request over the network to a second candidate data source of the plurality of candidate data sources based on a second ranking value of the plurality of ranking values.

20 Claims, 6 Drawing Sheets

| ENTRY | VALUE ATTRIBUTES | BINARY ATTRIBUTES |
|---|---|---|
| 1 | VALUE 1, VALUE 2 | BINARY 1, BINARY 2 |
| 2 | VALUE 1, VALUE 2 | BINARY 1 |
| 3 | VALUE 2 | BINARY 2 |
| 4 | ... | ... |

FIG. 4A

| DATASOURCES | COST 1 | VALUE 1 | VALUE 2 | VALUE 3 | COST 2 | BINARY 1 | BINARY 2 | TOTAL COST | TOTAL VALUE |
|---|---|---|---|---|---|---|---|---|---|
| DATASOURCE 1 | 20 | GREAT | EXCELLENT | GREAT | 40 | N | Y | 60 | 8 |
| DATASOURCE 2 | 30 | GOOD | VERY GOOD | GOOD | 20 | Y | Y | 50 | 4 |
| DATASOURCE 3 | 40 | FAIR | EXCELLENT | FAIR | 30 | N | N | 70 | 2 |
| DATASOURCE 4 | 50 | GREAT | FAIR | EXCELLENT | 30 | N | N | 80 | 9 |
| DATASOURCE 5 | 30 | FAIR | VERY GOOD | GREAT | 30 | Y | N | 60 | 5 |
| DATASOURCE 6 | 30 | EXCELLENT | GREAT | GOOD | 30 | N | N | 60 | 7 |
| DATASOURCE 7 | 30 | EXCELLENT | VERY GOOD | FAIR | 50 | Y | Y | 80 | 6 |
| DATASOURCE 8 | 50 | GOOD | FAIR | FAIR | 40 | Y | Y | 90 | 3 |
| DATASOURCE 9 | 40 | FAIR | EXCELLENT | VERY GOOD | 20 | Y | N | 60 | 4 |

FIG. 4B

SYSTEM AND METHOD FOR USING AN ARTIFICIAL INTELLIGENCE (AI) MODEL TO ROUTE DATA

TECHNICAL FIELD

The present disclosure relates generally to the field of predictive analytics, data processing, and data management. In particular, the present disclosure relates to using an artificial intelligence (AI) model to route data to data sources.

BACKGROUND

Determining the most appropriate data sources for satisfying a data request is a costly and timely task that requires manual collection and storage of data across multiple constraints, such as cost, timeliness, and regulatory compliance.

Rosters of data may include an extraordinarily large number of entities (e.g., organization such as, e.g., healthcare providers or other institutions), and each entity in the roster may have different data gaps that are required to be filled. A data request may be filed to fill the data gaps, but data sources may be costly, and not all data sources provide all necessary data for the roster. Determining a single data source that provides the data necessary to fill the data gaps for every entity is often difficult, and determining optimal data sources for each individual entity is often time-consuming, resulting in frequently sub-optimal data sources being selected based on convenience that may result in high costs.

SUMMARY

The present disclosure solves the technical challenges typically encountered during the use of a conventional method, such as those discussed above and elsewhere in the present disclosure. Specifically, the present disclosure solves the technical challenges by determining a ranking value for one or more candidate data sources for a data request using an AI model, and providing an output list of the candidate sources sorted by the determined ranking values. The ranking values may reflect which of the plurality of data sources are best suited to provide requested data for each entry in a data set and the output list reports a summary of which data sources can minimally best provide needed data to the user to cover all entries in the data request. This allows for avoiding duplicating data requests, processing, and storage cost where data is available through multiple data sources.

In some aspects, the techniques described herein relate to a computer-implemented method comprising: receiving, by one or more processors and from a user device, a user input including a data request associated with one or more data gaps, wherein the data request includes a data object including one or more entities and one or more attributes associated with each of the one or more entities; receiving, by the one or more processors, an input list including a plurality of candidate data sources for the data request; determining, by the one or more processors and an artificial intelligence (AI) model, a plurality of ranking values for the plurality of candidate data sources respectively based on the one or more attributes, each of the plurality of ranking values indicative of a likelihood of filling the one or more data gaps associated with the data request; sorting, by the one or more processors and the AI model, the plurality of candidate data sources by the plurality of ranking values; in response to receiving the data request, transmitting, by the one or more processors and to the user device, an output list that includes the sorted plurality of candidate data sources; in response to receiving, by one or more processors and from the user device, a response to the output list: routing, by the one or more processors and over a network, the data request to a first candidate data source of the plurality of candidate data sources based on a first ranking value of the plurality of ranking values; and blocking, by the one or more processors, routing of the data request over the network to a second candidate data source of the plurality of candidate data sources based on a second ranking value of the plurality of ranking values, wherein the first ranking value is higher than the second ranking value.

In some aspects, the techniques described herein relate to a system comprising: memory configured to store instructions; and one or more processors configured to execute the instructions to perform operations comprising: receiving, from a user device, a user input including a data request associated with one or more data gaps, wherein the data request includes a data object including one or more entities and one or more attributes associated with each of the one or more entities; receiving an input list including a plurality of candidate data sources for the data request; determining, by an artificial intelligence (AI) model, a plurality of ranking values for the plurality of candidate data sources respectively based on the one or more attributes, each of the plurality of ranking values indicative of a likelihood of filling the one or more data gaps associated with the data request; sorting, by the AI model, the plurality of candidate data sources by the plurality of ranking values; in response to receiving the data request, transmitting, by the one or more processors and to the user device, an output list that includes the sorted plurality of candidate data sources; in response to receiving, from the user device, a response to the output list: routing the data request over a network to a first candidate data source of the plurality of candidate data sources based on a first ranking value of the plurality of ranking values; and blocking routing of the data request over the network to a second candidate data source of the plurality of candidate data sources based on a second ranking value of the plurality of ranking values, wherein the first ranking value is higher than the second ranking value.

In some aspects, the techniques described herein relate to a non-transitory computer-readable medium storing instructions that, when executed by one or more processors, cause the one or more processors to perform operations comprising: receiving, from a user device, a user input including a data request associated with one or more data gaps, wherein the data request includes a data object including one or more entities and one or more attributes associated with each of the one or more entities; receiving an input list including a plurality of candidate data sources for the data request; determining, by an artificial intelligence (AI) model, a plurality of ranking values for the plurality of candidate data sources respectively based on the one or more attributes, each of the plurality of ranking values indicative of a likelihood of filling the one or more data gaps associated with the data request; sorting, by the AI model, the plurality of candidate data sources by the plurality of ranking values; in response to receiving the data request, transmitting, by the one or more processors and to the user device, an output list that includes the sorted plurality of candidate data sources; in response to receiving, from the user device, a response to the output list: routing the data request over a network to a first candidate data source of the plurality of candidate data sources based on a first ranking value of the plurality of ranking values; and blocking routing of the data request over the network to a second candidate data source of the plurality of candidate data sources based on a second ranking value of the plurality of ranking values, wherein the first ranking value is higher than the second ranking value.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and, together with the description, serve to explain the principles of the disclosed embodiments.

FIG. 4A is an example of a data object associated with a data request.

FIG. 4B is an example of a list of candidate data sources associated with a data request.

DETAILED DESCRIPTION OF EMBODIMENTS

Figure 1:
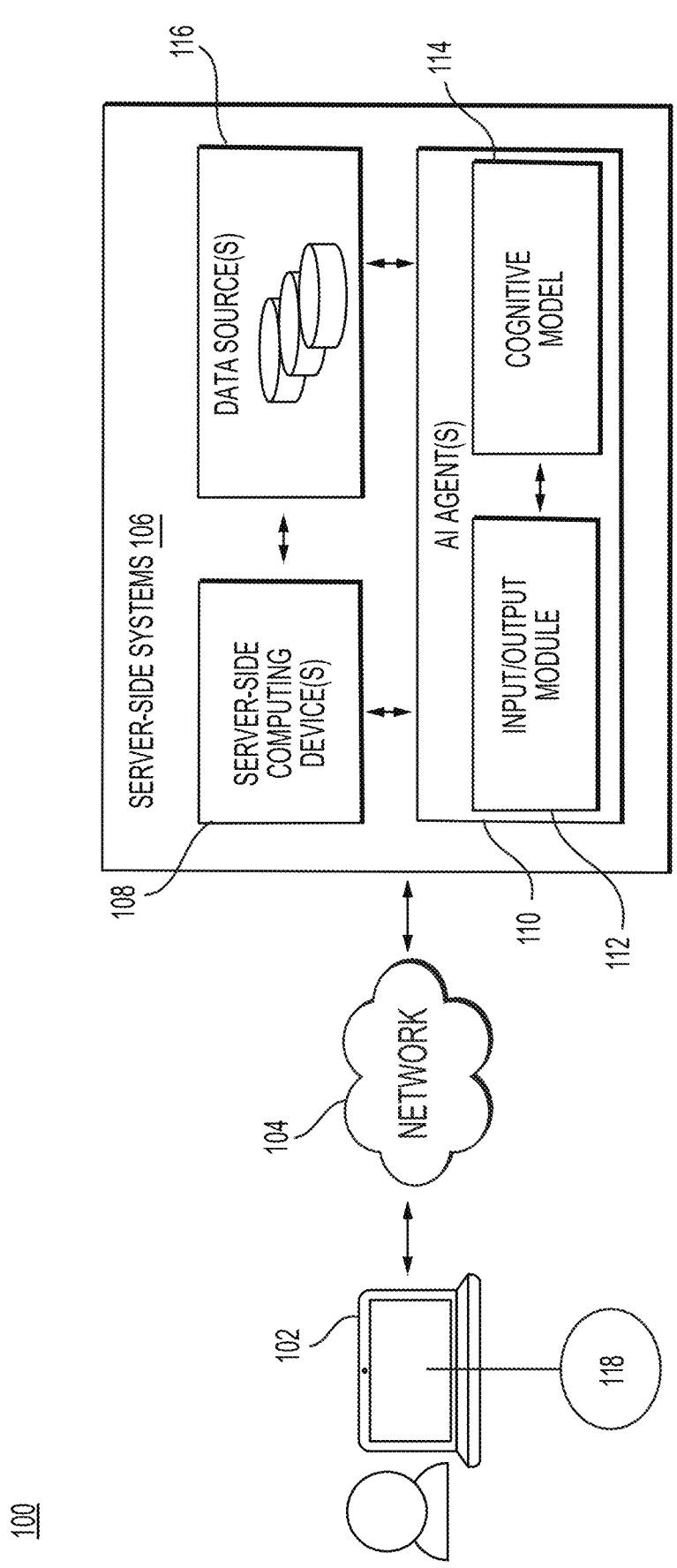
FIG. 1 is a diagram of an example environment for identifying data sources best suited for filling documentation gaps associated with a data request.

The present disclosure relates generally to the field of predictive analytics, data processing, and data management. In particular, the present disclosure relates to using machine learning models to route data to data sources.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods disclosed herein for using machine learning models to identify data sources best suited for filling documentation gaps associated with a data request.

Conventional rule-based methods fail to efficiently and cost-effectively identify data sources best suited for filling documentation gaps associated with a data request, and result in an increase of network traffic (and a corresponding reduction in network bandwidth) based on multiple, and sometimes redundant data requests being transmitted to more data sources than necessary to fill the documentation gaps. The conventional methods are frequently tedious, subjective, time consuming, error-prone, and expensive. It is technically challenging to develop methods that maximize high-speed, quality, and fidelity sources in an affordable manner and meet needs in view of cost, timeliness, regulatory compliance, quality, and age of data.

The present disclosure provides embodiments that address the above shortcomings in the field of predictive analytics, data processing, and data management, leading to significant technical improvements in the same field. For instance, a system of one or more artificial intelligence (AI) agents 110 discussed in the present disclosure overcomes the technical shortcomings of the conventional techniques by determining a ranking value for one or more candidate data sources for a data request, and routing data requests over a network to certain candidate data sources based on the ranking values for the candidate data sources, and blocking the routing of data requests over the network to other candidate data sources based on the ranking values for the candidate data sources. This allows for avoiding duplicating data requests, reducing unnecessary backlogs to network traffic due to redundant data requests, and reducing computational resources, such as, e.g., processing and storage cost, where data is available through multiple data sources in an efficient and expeditious manner, without the shortcomings of the conventional, rule-based approach discussed above. The disclosed techniques leads to further technical advancements in the technological fields discussed above, including the expeditious and accurate assessment of data sources at which a data request may be fulfilled by way of predictive analytics, the easing of congestion over networks as the traffic is reduced commensurate with the reduction in unnecessary data requests, and the automation of documentation gap-related remedial actions based on the results of the data source assessment. Because the identification of most efficient data sources can be achieved expeditiously and accurately, the subsequent documentation gap-related remedial actions are also performed in an expeditious, accurate manner, leading to a fast resolution of documentation gaps without wasting unnecessary computational resources associated with duplicated data requests, network communications (e.g., network bandwidth usage), data processing, and others.

Advantageously, the AI agent(s) 110 include a plurality of agents 110, each agent including a cognitive model, that run in parallel to evaluate a data object associated with the data request. The data object is input by a user and can sometimes include an extremely large number of entries, and each entry in the data object often includes different attributes to be evaluated by the AI agent(s) to determine a suitable data source to accommodate the entry. In some examples, each AI agent 110 is a Soar cognitive agent and is included within a Python-coded "worker" process. In these examples, each Python process creates its own instance of an AI agent, collects input tasks in the form of entries within a data object, forwards those tasks to the AI agent 110, receives and parses outputs from the AI agent 110, and then sends the results from the AI agent 110 to an output queue. The number of AI agents 110 is designed to scale according to the number of entries within a data object.

The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 is a diagram showing an example of an environment 100 for identifying data sources best suited for filling documentation gaps associated with a data request, according to some embodiments of the disclosure. A client device 102 associated with a user communicates with one or more other components of the environment 100 across a network 104, including one or more server-side systems 106. The server-side systems 106 may be local or remote file servers, cloud-based storage services, or other forms of computer systems.

The server-side systems 106 include server-side computing device(s) 108, AI agent(s) 110, and/or one or more data storage system(s) 116, among other systems. In some examples, the AI agent(s) 110 include an input/output module 112 and a cognitive model 114. The data storage system(s) 116 include one or more data stores or data sources.

In some examples, the server-side computing device(s) 108, the AI agent(s) 110, and/or the data storage system(s) 116 are associated with a common entity/organization (e.g., a healthcare provider or other institution) and are part of a cloud service computer system (e.g., in a data center). That is, the various systems can be components or subsystems of a larger computer system. In other examples, one or more of the server-side computing device(s) 108, the AI agent(s) 110, and/or the data storage system(s) 116 are separate systems associated with different entities. In such examples, each of the separate systems are communicatively connected to one another over the network 104 (e.g., via an application programming interface (API)). The systems and devices of the environment 100 can communicate in any arrangement. As discussed herein, systems and/or devices of the environment 100 communicate in order to facilitate processing of data objects, particularly the identification of data sources best suited for filling documentation gaps associated with a data request.

The client device 102 is configured to enable the user to access and/or interact with other systems in the environment 100. In some examples, the user is associated with (e.g., is an employee or contractor of) the organization. The client device 102 is a computer system such as, for example, a desktop computer, a laptop computer, a tablet, a smart cellular phone, a smart watch, or other wearable computer, etc. The client device 102 includes one or more applications 118, e.g., an application programming interface (API), program, plugin, browser extension, etc., installed on a memory of the client device 102.

In some embodiments, at least one of the applications is associated and configured to communicate with one or more of the other components in the environment 100, such as one or more of the server-side systems 106. For example, the at least one application 118 can be executed on the client device 102 to communicate with the server-side computing device(s) 108 to transmit a data request and/or a data object.

Additionally, one or more components of the client device 102, such as the at least one application 118, generate, or cause to be generated, one or more graphic user interfaces (GUIs) based on instructions/information stored in the memory, instructions/information received from the other systems in the environment 100, and/or the like and cause the GUIs to be displayed via a display of the client device 102. The GUIs can be, e.g., mobile application interfaces or browser user interfaces and include text, input text boxes, selection controls, and/or the like. In some examples, the display includes a touch screen or a display with other input systems (e.g., a mouse, keyboard, etc.) to control the functions of the client device 102.

The server-side computing device(s) 108 include one or more server devices (or other similar computing devices) for executing services associated with an organization. The services can include both user-facing services as well as internal services.

In some examples, the AI agent(s) 110 is a system of (e.g., is hosted by) the same entity/organization associated with the server-side computing device(s) 108. In such examples, the AI agent(s) 110 can be a sub-system or component of the server-side computing device(s) 108. In other examples, the AI agent(s) 110 is a system of (e.g., is hosted by) a third party that provides services for identifying data sources best suited for filling documentation gaps associated with a data request to the entity/organization associated with the server-side computing device(s) 108.

The AI agent(s) 110 includes one or more server devices (or other similar computing devices) for executing processes for identifying data sources best suited for filling documentation gaps associated with a data request. As described in detail elsewhere herein, example processes for identifying data sources best suited for filling documentation gaps associated with a data request include: receiving a user input including a data request from a user device, wherein the data request includes a data object including one or more entities and one or more attributes; receiving an input list of one or more candidate data sources for the data request; determining, by an artificial intelligence (AI) model (e.g., one or more AI agents performing operations in parallel, each of the one or more AI agents including a cognitive model), a ranking value for each of the one or more candidate data sources based on the one or more attributes; sorting, by the AI model, the one or more candidate data sources by the ranking value for each of the one or more candidate data sources; and transmitting, to the user device, an output list of the one or more candidate data sources for the data request sorted by the ranking value for each of the one or more candidate data. sources The data storage system(s) 116 each include a server system or computer-readable memory such as a hard drive, flash drive, disk, etc. The data stores of the data storage system(s) 116 include and/or act as a repository or source for various types of data objects.

In some examples, one of the data storage system(s) 116 maintains each of the data stores. In other examples, one or more of the data stores are maintained across two or more different ones of the data storage system(s) 116. One or more of the data storage system(s) 116 can be a system of (e.g., hosted by) the same entity/organization associated with the server-side computing device(s) 108 and/or AI agent(s) 110. Additionally or alternatively, one or more of the data storage system(s) 116 are associated with a third party that provides data storage services to the entity/organization and/or AI agent(s) 110.

The network 104 over which the one or more components of the environment 100 communicate includes one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" means connecting to or accessing source data or information from a location remote from other devices or networks coupled to the Internet. Alternatively, "online" refers to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The client device 102 and one or more of the server-side systems 106 are connected via the network 104, using one or more standard communication protocols. The client device 102 and the one or more of the server-side systems 106 transmit and receive communications from each other across the network 104.

Although depicted as separate components in FIG. 1, it should be understood that a component or portion of a component in the system of the environment 100 is, in some embodiments, integrated with or incorporated into one or more other components. As one example, the input/output module 112 and cognitive model 114 can be integrated into a single component or sub-system of the AI agent(s) 110. In some embodiments, operations or aspects of one or more of the components discussed above are distributed amongst one or more other components. Any suitable arrangement and/or integration of the various systems and devices of the environment 100 can be used.

In the following disclosure, various acts are described as performed or executed by a component represented in FIG. 1, such as the client device 102 or one or more of the server-side systems 106, or components thereof. However, it should be understood that in various aspects, various components of the environment 100 discussed above execute instructions or perform acts including the acts discussed below. An act performed by a device is considered to be performed by one or more processors, actuators, or the like associated with that device. Further, it should be understood that in various embodiments, various steps can be added, omitted, and/or rearranged in any suitable manner.

Figure 2:
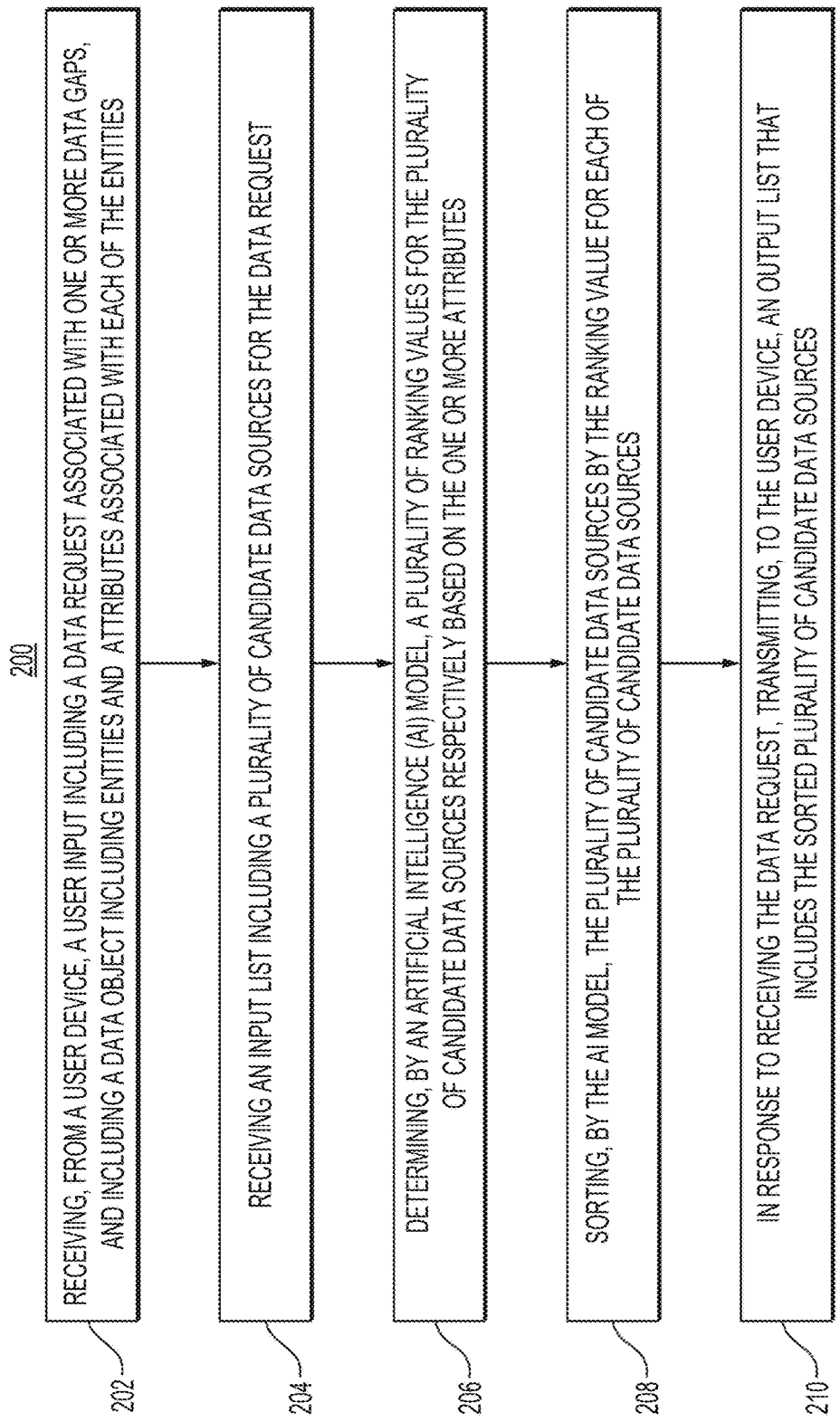
FIG. 2 is a flowchart of an example process for identifying data sources best suited for filling data gaps associated with a data request.
Figure 3:
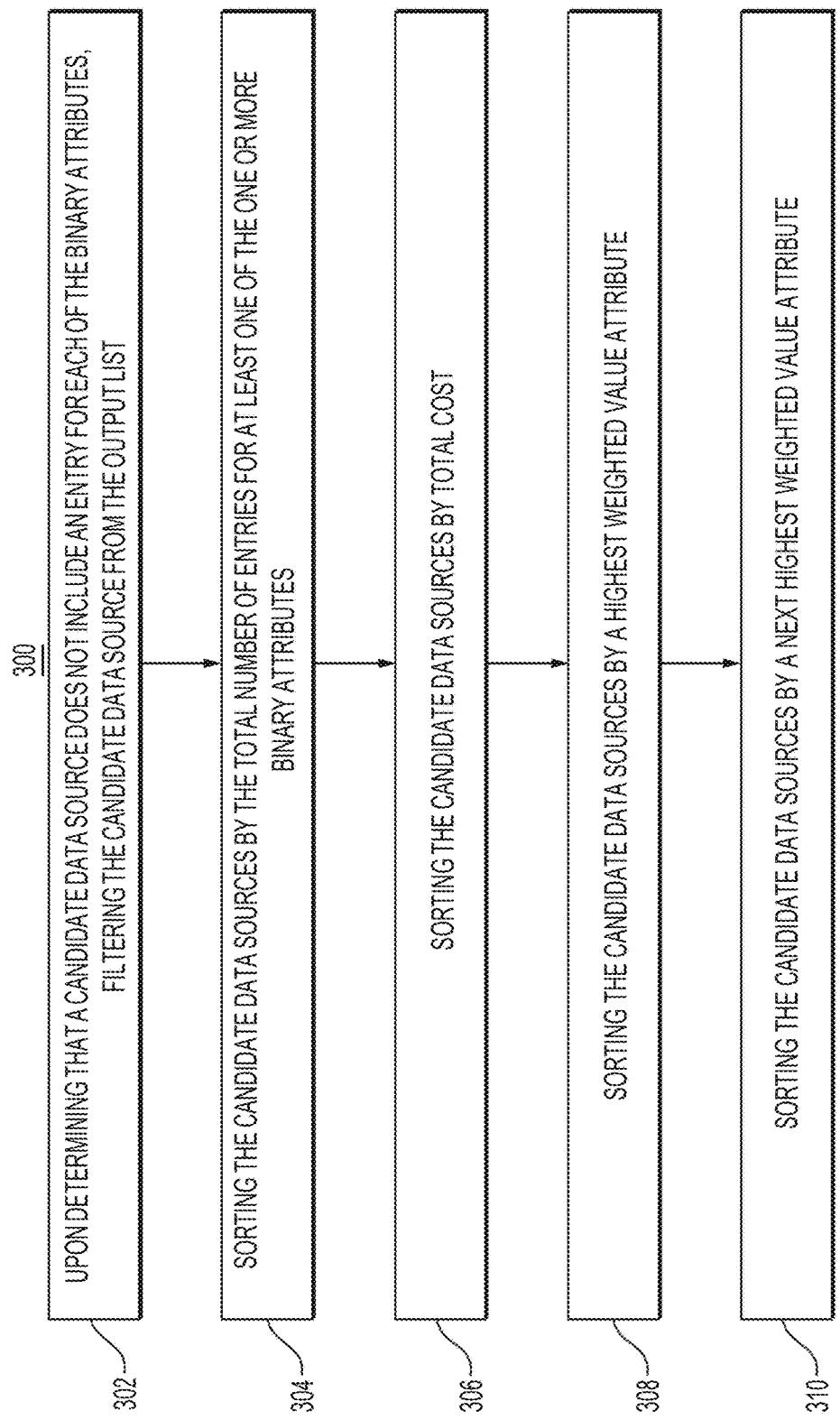
FIG. 3 is a flowchart of an example process for using an AI model to rank data sources best suited for filling data gaps associated with a data request.

The functioning of the AI agent(s) 110 will now be described in more detail with regard to FIGS. 2-4B. FIG. 2 is a flowchart of an example process for identifying data sources best suited for filling documentation gaps associated with a data request. FIG. 3 is also a flowchart of an example process for using an AI model to rank data sources best suited for filling documentation gaps associated with a data request. The processes described in FIGS. 2 and 3 will be described with reference to FIGS. 4A and 4B.

FIG. 4A provides an example data object 400 comprising the data request. The data object 400 includes one or more entries 402, and one or more user-input attributes, which are selected from value attributes 404 and binary attributes 406.

The data request is made in the context of an organization and a tenant. In some examples, an organization can be a company or corporation or a division within a larger company or corporation. The user can enter information for organizations through, for example, an API interface in communication with the input/output module 112 of the AI agent 110, and subsequent data requests may be populated with options of organizations to choose from based on user inputs. The input/output module 112 receives from the user a universally unique identifier (UUID), and the user provides other metadata for the organization associated with the data request, such as a name for the organization, a contact name and e-mail address, a description of the organization, etc.

When creating the data request, the user creates a tenant through the API interface in communication with the input/output module 112 of the AI agent 110, where the tenant is an isolated container with software and data within the scope of a selected organization. An organization list can be populated based on the user identified organizations for the user to choose from. A tenant can be saved to a store with an associated organization's UUID for future use. A user can create one or more "projects" within a data request in the context of a tenant. In some examples, each project within a data request may be associated with an organization, a tenant, and one or more attributes. A project is created under the context of a tenant and holds attribute weights and data sources. This project configuration can be associated with one or multiple data sources submitted in the context of a tenant.

In some examples, the data object 400 is a roster of members in a healthcare cohort, where the entries 402 are members (e.g., patients) in the healthcare cohort. The value attributes 404 can be, for example, data relating to a purpose of use for the roster, such as risk adjustment or quality, general attributes such as the speed or ease of use of the data source. The binary attributes 406 are specific data that a user requires the data source to include. For example, one binary attribute can be body mass index (BMI). Selecting a binary attribute such as BMI is an indication by a user that the preferred data sources should be those that include data for BMI.

Once a tenant is created by the user, a list of candidate data sources is created within the context of the tenant and the data request. Users can create entries for data sources associated with tenants, such that a data request associated with a tenant can be pre-populated with a list of candidate data sources. FIG. 4B is an example of a list 410 of candidate data sources associated with a data request. In the example shown in FIG. 4B, the list 410 includes, arranged in a matrix that can be default or defined by a user, the candidate data sources 412, a first cost attribute 414, a first value attribute 416, a second value attribute 418, a third value attribute 420, a second cost attribute 422, a first binary attribute 424, a second binary attribute 426, a total cost attribute 428, and a total value attribute 430. In some examples where the data object 400 is a roster of members in a healthcare cohort, the first cost attribute 414 is a per member per year (PMPY) cost, the first value attribute 416 is a measure of the risk adjustment data of the data sources, the second value attribute 418 is a quality of the data, the third value attribute 420 is a measure of the speed with which the data is delivered, the second cost attribute 422 is a storage and processing cost, the first binary attribute 424 is a Yes/No value identifying whether the data in the data source includes a certain type of data (e.g., health/medical data such as, e.g., colonoscopy data), and the second binary attribute 426 is a Yes/No value identifying whether the data in the data source includes another type of data (e.g., health/medical data such as, e.g., BMI data). The total cost attribute 428 is a numerical sum of the first cost attribute 414 and the second cost attribute 422. The total value attribute 430 is a sum of a score for each of first value attribute 416, second value attribute 418, and third value attribute 420. More or fewer attributes can be included without diverging from the scope of this disclosure, and the number of attributes in FIGS. 4A and 4B are for example purposes only. The model has the capability of incorporating information about whether the user already has a contract with a data source for a particular member entry in the data object that could be purchased from that data source. If so, the invention automatically adjusts the first cost attribute 414 (PMPY) for that member for that data source to be 0.

The value attributes are generally subjective attributes that may be scored by a user or an AI model. In some examples, the value attributes may be scored on a scale of 1-5, with a higher score corresponding to a higher suitability for a data source for the value attribute. For example, the scores can be calculated as follows:

Fair—1
Good—2
Very Good—3

Great—4
Excellent—5

The candidate data sources can be, for example, any of the following file types: Flat file (similar to CCD with delimited or fixed width file format); ADT or ORU (HL7 v2.x); HL7 v2.x VXU; C-CDA/CCD (HL7 v3.x); FHIR Resource (HL7 v4.x); or API (RESTful web services).

With reference to FIG. 2, a process 200 for identifying data sources best suited for filling documentation gaps associated with a data request is described. Process 200 can be performed by the server-side systems 106 or the components therein (e.g., one or more AI agents 110).

At block 202, the process 200 can include receiving, from a user device, a user input including a data request associated with one or more data gaps (e.g., documentation gaps, etc.), the data request including a data object including one or more entities and one or more attributes associated with each of the one or more entities. As discussed above, FIG. 4A provides an example data object 400 included in a data request. The data object 400 includes one or more entries 402, and one or more user-input attributes, which are selected from value attributes 404 and binary attributes 406. In some examples, the data object 400 represent a roster of members (e.g., patients) in a healthcare cohort, where each entry 402 is associated with a member in the healthcare cohort. The value attributes 404 can be, for example, data relating to a purpose of use for the roster, such as risk adjustment or quality. The binary attributes 406 indicate specific data that a user requires the data source to include. For example, one binary attribute can be body mass index (BMI). Selecting a binary attribute such as BMI is an indication by a user that the preferred data sources should be those that include data for BMI.

At block 204, the process 200 can include receiving an input list including a plurality of candidate data sources for the data request. The candidate data sources may be user-defined or automatically generated by the AI agents 110 based on historical data. FIG. 4B depicts an example of a list 410 of data sources.

At block 206, the process 200 can include determining, by an artificial intelligence (AI) model, a plurality of ranking values for the plurality of candidate data sources respectively based on the one or more attributes, each of the plurality of ranking values indicative of a likelihood of filling the one or more data gaps associated with the data request. Determining the ranking value is described in greater detail with reference to FIG. 3 below, and includes at least: (i) filtering by the binary attributes; (ii) sorting by the binary attributes; and (iii) sorting by weighted value attributes.

At block 208, the process 200 includes sorting, by the AI model, the plurality of candidate data sources by the plurality of ranking values. This includes producing an output list of the candidate data sources sorted from highest ranking value to lowest ranking value. In some examples, the ranking value for each data source is a relative value that is dependent on the other data sources. For example, if there are N data sources, the highest ranking value will be N and the lowest ranking value will be 1. The output list sorts the data sources in order of these ranking values. Once the one or more candidate data sources are sorted by the ranking value, an output list of the ranked one or more candidate data sources is generated, for transmission to the user device.

At block 210, the process 200 includes, in response to receiving the data request, transmitting, by the one or more processors and to the user device, an output list that includes the sorted plurality of candidate data sources. The output list can be provided via the input/output module 112 for display at the user device and can include all candidate data sources that were not excluded in the filtering process, or can include a specific number of the highest ranked data sources, e.g., the three highest ranked data sources. A user can use the output list to further investigate the costs, quality, fidelity, etc., of the highest ranked data sources to more efficiently identify and select an optimal data source for the input data request. In some examples, the AI agent(s) 110 may automatically initiate a retrieval of data from the highest ranked data source, with or without requiring approval from a user.

In an example, the process 200 further includes, in response to receiving, from the user device, a response to the output list: routing, over a network, the data request to a first candidate data source of the plurality of candidate data sources based on a first ranking value of the plurality of ranking values; and blocking routing of the data request over the network to a second candidate data source of the plurality of candidate data sources based on a second ranking value of the plurality of ranking values, wherein the first ranking value is higher than the second ranking value. In some examples, this includes dropping or excluding, from the output list, one or more of the plurality of candidate sources with a ranking value below a predetermined threshold. The predetermined threshold is selected by a user and may reflect a relative value or a general value. An example of a relative value includes, e.g., the top three ranked candidate data sources exceed a predetermined threshold, and all others are below the predetermined threshold, the predetermined threshold being defined as "top three." Alternative, the rankings can comprise numerical values, e.g., on a scale of 0 to 10, and the predetermined threshold may be set to a value between 0 and 10. For example, a predetermined threshold is set at 5 and all candidate sources with a raw score of less than 5 are dropped.

Moreover, the process 200 includes other remedial actions in response to the identification of highest ranked candidate data sources, such as updating the data object 400 in a format associated with the candidate data source with a highest ranking value, prior to routing the data request to that candidate data source. This would allow for efficient and streamlined filling of documentation gaps in data object 400 from the candidate source with the highest ranking value. In another example, the process 200 includes generating the data object 400 in the format associated with a candidate data source, and automatically retrieving the data from the candidate data source and automatically filling documentation gaps in the data object 400 with the data retrieved from the candidate data source.

Additionally, the process 200 can include automatically routing, over a network, the data request to at least a first candidate data source of the plurality of candidate data sources based on the ranking values determined for the plurality of candidate data sources. For example, the process 200 may include routing a data request to be sent over the network to the candidate sources with the highest ranking values, such as the highest one, two, or three ranking values. Similarly, the process 200 can include blocking routing of the data request over the network to at least a second candidate data source of the one or more candidate data sources based on the ranking values determined for the plurality of candidate data sources, wherein the ranking value for the first candidate data source is higher than the ranking value for the second candidate data source. In response to the data request, the candidate source fulfills the data request by extracting and transmitting relevant data to the server-side systems 106, which the server-side systems 106 use to automatically fill the identified documentation gaps in the data object 400.

FIG. 3 is a flowchart of an example process for using an AI model (e.g., one or more AI agents performing operations in parallel, each of the one or more AI agents including a cognitive model) to rank data sources best suited for filling documentation gaps associated with a data request. In particular, FIG. 3 describes a process 300 for determining a ranking value for each of the one or more candidate data sources based on one or more attributes. The process 300 is performed on one entry 402 at a time by the AI agent(s) 110, or is performed on multiple entries in parallel. The process 300, in this example, begins by determining whether any binary attributes are included for an entry. In one example, the process 300 will be demonstrated for entry 2 in FIG. 4A. A user has identified the first binary attribute 424 (Binary 1) among the binary attributes 406 required in data object 400 for entry 2. In other examples, the operations in process 300 may be interchanged and performed in a different order. Steps may be added, removed, or re-arranged to methods described within the scope of the present disclosure.

At block 302, process 300 includes, upon determining that a candidate data source does not include an entry for each of the binary attributes, filtering the candidate data source from the output list. In the example shown in FIGS. 4A and 4B, this would result in filtering data source 1, data source 3, data source 4, and data source 6 out of the output list for entry 2, as these data sources do not include a data entry for the first binary attribute 424 (Binary 1). At this point, the output list is {2, 5, 7, 8, 9}. The curly brackets indicate an unsorted list, as all the data sources have the same relative value as of the process step performed in block 302. Namely, they all include a data entry for the first binary attribute 424, which was indicated as a necessary binary attribute in data object 400.

At block 304, the process 300 includes sorting the candidate data sources by the total number of entries for at least one of the one or more binary attributes. In the example shown in FIGS. 4A and 4B, this comprises sorting data sources {2, 5, 7, 8, 9} by those that have a data entry for the second binary attribute 426. Note that binary attribute was not indicated as a necessary binary attribute for entry 2 in data object 400. As such, no action is performed for entry 2 at block 304 and the output list after the step performed in block 304 remains unchanged.

At block 306, the process 300 includes sorting the candidate data sources by total cost. Procuring data from data sources can be expensive, such that sorting by total cost constitutes a high priority. Often, there are many cost factors associated with procuring data. In list 410, a first cost attribute 414 and a second cost attribute 422 are shown. These attributes should be in consistent units, such as USD. A total cost attribute 428 is calculated by summing the first cost attribute 414 and the second cost attribute 422 in a pre-processing step. As such, the output list is sorted by the total cost attribute 422 at block 306. As a result, the output list after the step performed in block 306 is [2, 7, 8, {5, 9}]. Sorting by total cost comprises sorting by lowest cost to highest cost. Further, the sorting was performed separately for data sources 2, 7, 8, and data sources 5 and 9 based on the results of the sorting performed in block 304. Subsequent sorting steps are performed to differentiate unsorted data sources. As a result, data sources 2, 7, and 8 are the top three data sources, in that order. Any subsequent sorting steps will be used to differentiate data sources 5 and 9. Total cost is one of the weighted attributes and can be used in any order relative to the other attributes. Because it is a different data type, which is minimized rather than maximized, it does not share a weight with any other attributes and is subject to different processing logic. However, in other examples, it is set by the user to be prioritized last rather than first, or somewhere in the middle.

At block 308, the process 300 proceeds to sorting the candidate data sources by a highest weighted value attribute. A user defines value attributes by a weight. The weights may be absolute or relative. In other words, a user designates weights as, for example, "high," "medium," "low," etc., with attributes of equal weight being treated equally, the weights being absolute. For weighted attributes, the user is able to configure multiple attributes with equal weights, not just unique or relative weights. For example, if Value 2 and Value 3 have the same weight, and data source 1 has values [Excellent] and [Fair] for each, respectively, and data source 2 has values [Great] and [Very Good], sorting by best average value would give preference to data source 2, while best maximum value would give preference to data source 1. Alternatively, a user designates weight as relative. For example, for entry 1 in data object 400, a user has indicated value attributes value 1 and value 2 as value attributes of interest, and can assign weights to them either as: value 1: high, value 2: high, or value 1: high, value 2: low, or sort them by relative weights, e.g.: highest value 1, next highest value 2. If a user had indicated the first value attribute 1 as the highest weighted value attribute, first the candidate data sources would be sorted by value attribute 1. Because data sources 5 and 9 have the same value for value attribute 1 ("Fair"), the output list is unaltered by the step performed in block 308. As a result, the output list after the step performed in block 308 remains [2, 7, 8, {5, 9}].

At block 310, the process 300 includes sorting the candidate data sources by a next highest weighted value attribute. As such, the candidate data sources are sorted by value attribute 2. Because data source 9 is "Excellent" while data source 5 is "Very Good," data source 9 is thus sorted ahead of data source 5. As a result, the output list after the step performed in block 308 is [2, 7, 8, 9, 5].

Similar processes 300 can be performed on entries 1, 3, and 4 to arrive at the following output lists for the other entries. Entry 1: [2, 7, 8]. Entry 3: [2, 1, 7, 8]. Entry 4: [2, 1, 6, 5, 9, 3, 4, 7, 8]. In the example of entry 4, the data sources 1, 5, and 9 are sorted by total value attribute 430 as a final step as no weights are provided for any of the value attributes 416-420.

Output processing in some examples includes aggregating the output data source rankings generated per entry of the data object to yield a single recommendation to the user for which data sources they can use to satisfy the entire data request. For example, the output takes the form "use data sources X, Y, Z to satisfy all entries of the data object" and "using just these data sources vs the whole default set of data sources will save ~$X". To aid in tying the data acquired from the data sources to the entries in the data request, metadata may be used to track the entries. This metadata can include, for example, a Unique Roster Identifier (Roster ID) for the data object, Total number of entries, Date and Timestamp when a status (e.g., a data request) began, Date and Timestamp when the status ended, Begin Status (e.g., Basic Validation In-Progress, De-Duplication In-Progress, Member Validation In-Progress, Agent Processing In-Progress), End Status (e.g., Basic Validation Completed, De-duplication Completed, Member Validation Completed, Processing Completed), Total number of duplicates, Total number of error records (validation failed), Total number of error records (agent processing failed), Total records successfully processed, Reconciliation of total member records (e.g., Total records successfully processed+duplicates+error records (validation failure)+error records (agent processing failure)+missed records).

Each output file from the data request can also include metadata with information relating to, for example, an Initial Roster file, Files with the duplicate records, Files with the non-duplicate records, File with member validation failed records (with error information), Files with member validation successful records, Files with agent processing failed records (with error information), and Successful records for each data source (recommendation files-output roster files, the final output files).

The error details in the metadata can include, for example, an error code, an error field if applicable, a user-friendly error message, and error details (e.g., a system message). An additional sorting step is included in some examples, in which the AI agent(s) sort data sources based on how confident the tool is that the data source actually has the desired data for that member. This step can be inserted before or after sorting by binary attributes or weighted attributes. In some examples, it is a special case of the weighted attribute sorting step where the confidence metric is considered a case of any other attribute. Similarly, the binary attribute sort step is, in some examples, a special case of weighted attribute sorting with the extra feature that it can filter out a data source if it has a 0 score.

Figure 5:
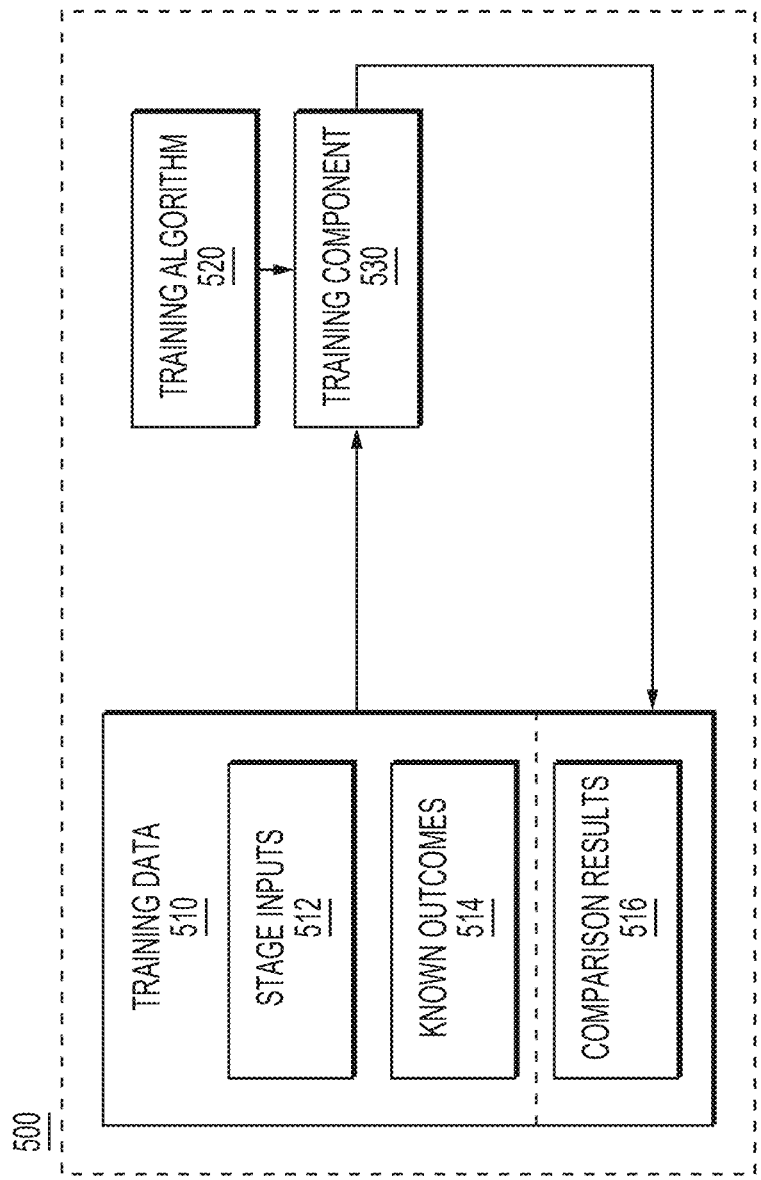
FIG. 5 shows an example of an AI model training flow chart.

FIG. 5 shows an example machine learning training flow chart 500, according to some embodiments of the disclosure. Referring to FIG. 5, a given machine learning model, such as the cognitive model 114 of AI agent(s) 110, is trained using the training flow chart 500. The training data 510 includes one or more of stage inputs 512 and the known outcomes 514 related to the machine learning model to be trained. The stage inputs 512 are from any applicable source, including text, visual representations, data, values, comparisons, and stage outputs, e.g., one or more outputs from one or more steps from FIGS. 2-3. For example, the stage inputs 512 may include data source rankings associated with particular data requests. The known outcomes 514 are included for the machine learning models generated based on supervised or semi-supervised training or can be based on known labels, such as review classification labels. An unsupervised machine learning model is not trained using the known outcomes 514. The known outcomes 514 include known or desired outputs for future inputs similar to or in the same category as the stage inputs 512 that do not have corresponding known outputs.

The training data 510 and a training algorithm 520, e.g., one or more of the modules implemented using the machine learning model or used to train the machine learning model, are provided to a training component 530 that applies the training data 510 to the training algorithm 520 to generate the machine learning model, e.g., the cognitive model 114. According to an implementation, the training component 530 is provided with comparison results 516 that compare a previous output of the corresponding machine learning model to apply the previous result to re-train the machine learning model. The comparison results 516 are used by the training component 530 to update the corresponding machine learning model. In addition to a cognitive model, in some examples, the training algorithm 520 utilizes machine learning networks or models including, but not limited to, deep learning networks such as Deep Neural Networks (DNN), Convolutional Neural Networks (CNN), Fully Convolutional Networks (FCN), and Recurrent Neural Networks (RCN), probabilistic models such as Bayesian Networks and Graphical Models, classifiers such as K-Nearest Neighbors, or discriminative models such as Decision Forests and maximum margin methods, the model specifically discussed herein, or the like.

The cognitive models 114 used herein are trained to learn to adjust the values assigned to different data sources (low, medium, high, etc) for different attributes based on those data sources' performance. The content that the model is trained on varies, in some examples, to include learning different values for different data sources' attributes (to be used during sorting), learning the likelihood of a data source satisfying a binary attribute to allow for sorting and filtering by the binary attribute, and learning special case logic for sorting data sources in particular scenarios, for example for changing the order of sorting steps in special cases.

The initial training of the machine learning models may be completed by utilizing data that has been tagged. In some embodiments, this tagged data serves as an input for supervised or semi-supervised learning approaches. The tagging process can be done manually or automatically, depending on the desired level of accuracy and available resources.

Manual tagging involves human annotators who examine training data and assign appropriate classification labels based on the content and context of the training data. This method can yield high-quality labeled data, as humans can understand nuances and contextual information better than automated algorithms. However, manual tagging can be time-consuming and labor-intensive, especially when dealing with large datasets.

Automatic tagging, on the other hand, involves using algorithms, such as natural language processing techniques or pre-trained machine learning models, to assign classification labels to reviews. This approach is faster and more scalable than manual tagging but may not be as accurate, particularly when dealing with complex or ambiguous items. To improve the accuracy of automatic tagging, it can be combined with manual tagging in a semi-supervised learning approach, where a smaller set of manually tagged data is used to guide the automatic tagging process.

The data collection process can be done manually or using web-scraping techniques. Manual data collection can be time-consuming and may not cover all the available data sources. Web-scraping techniques, on the other hand, use automated tools and scripts to extract data from various sources, making the process faster and more comprehensive.

Once data has been collected and tagged with appropriate classification labels, it can be used as input for the machine learning model's training process. The model will learn to recognize patterns and features in the data that correspond to specific contexts for data. With sufficient training and accurate labeled data, the machine learning model can become adept at identifying context-specific outputs, enabling an efficient and effective model.

It should be understood that embodiments in this disclosure are examples only, and that other embodiments may include various combinations of features from other embodiments, as well as additional or fewer features.

In general, any process or operation discussed in this disclosure that is understood to be computer-implementable, such as the processes illustrated in FIGS. 2-3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices to perform a computer-implemented method. A memory of the computer system may include the respective memory of each computing device of the plurality of computing devices.

Figure 6:
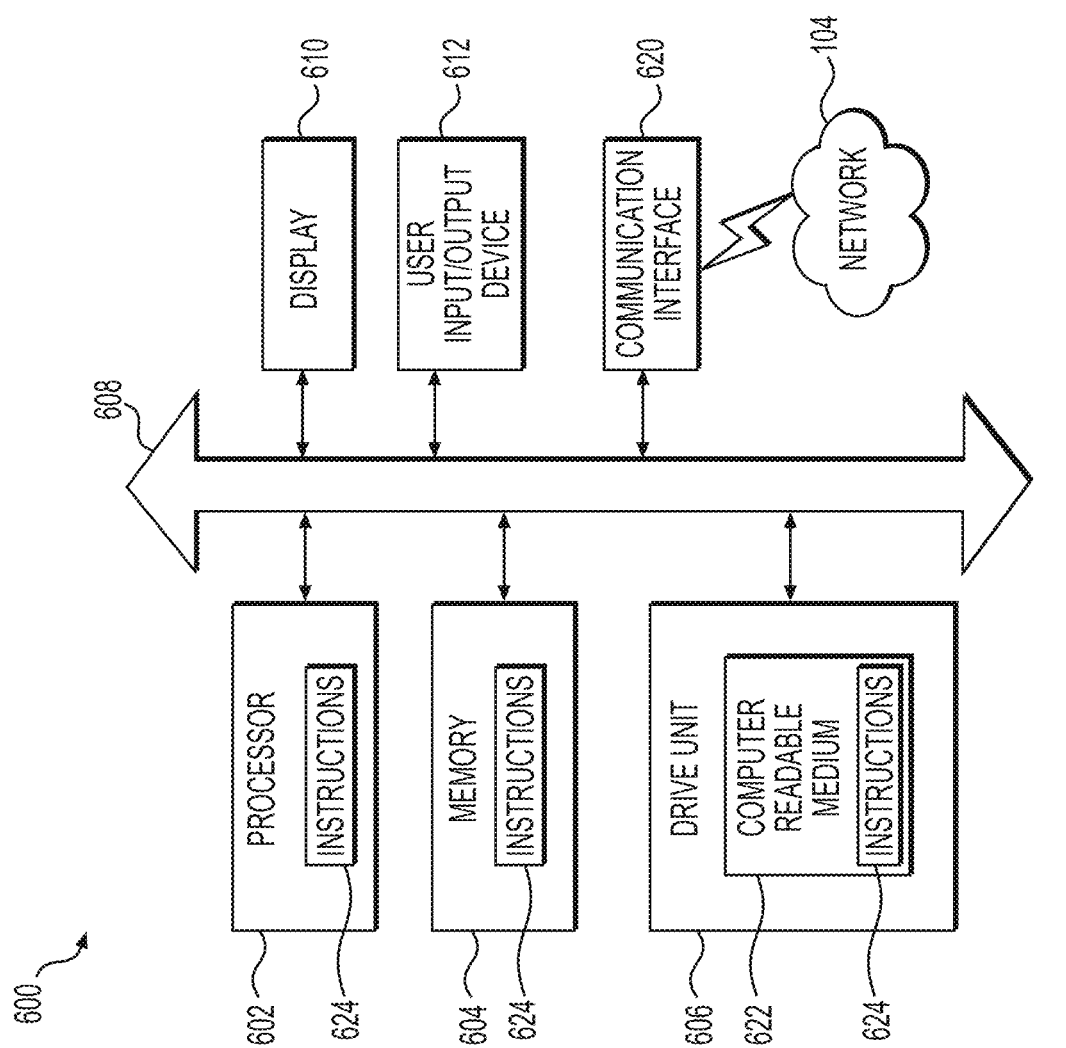
FIG. 6 is a functional block diagram of a computing device that may execute the techniques described herein.

FIG. 6 is a simplified functional block diagram of a computer 600 that may be configured as a device for executing the methods of FIGS. 1-5, according to example embodiments of the present disclosure. In various embodiments, any of the systems herein may be a computer 600 including. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications (e.g., via network 140). The computer 600 may also have a memory 604 (such as RAM) storing instructions 624 for executing techniques presented herein, although the instructions 624 may be stored temporarily or permanently within other modules of computer 600 (e.g., processor 602 or computer readable medium 622). The computer 600 also may include input and output ports 612 or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "items" or "articles of manufacture" typically in the form of executable code or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

Example 1. A computer-implemented method comprising: receiving, by one or more processors and from a user device, a user input including a data request associated with one or more data gaps, wherein the data request includes a data object including one or more entities and one or more attributes associated with each of the one or more entities; receiving, by the one or more processors, an input list including a plurality of candidate data sources for the data request; determining, by the one or more processors and an artificial intelligence (AI) model, a plurality of ranking values for the plurality of candidate data sources respectively based on the one or more attributes, each of the plurality of ranking values indicative of a likelihood of filling the one or more data gaps associated with the data request; sorting, by the one or more processors and the AI model, the plurality of candidate data sources by the plurality of ranking values; in response to receiving the data request, transmitting, by the one or more processors and to the user device, an output list that includes the sorted plurality of candidate data sources; in response to receiving, by one or more processors and from the user device, a response to the output list: routing, by the one or more processors and over a network, the data request to a first candidate data source of the plurality of candidate data sources based on a first ranking value of the plurality of ranking values; and blocking, by the one or more processors, routing of the data request over the network to a second candidate data source of the plurality of candidate data sources based on a second ranking value of the plurality of ranking values, wherein the first ranking value is higher than the second ranking value.

Example 2. The computer-implemented method of example 1, wherein the one or more attributes include one or more binary attributes, and wherein determining the ranking value for each of the plurality of candidate data sources comprises: determining whether each of the plurality of candidate data sources includes an entry for each of the one or more binary attributes; and upon determining that at least one of the plurality of candidate data sources does not include an entry for each of the one or more binary attributes, filtering the at least one of the plurality of candidate data sources from the output list.

Example 3. The computer-implemented method of example 2, wherein determining the ranking value for each of the plurality of candidate data sources further comprises: upon determining that two or more of the plurality of candidate data sources include an entry for at least one of the one or more binary attributes, sorting the two or more of the plurality of candidate data sources by a total number of entries for at least one of the one or more binary attributes.

Example 4. The computer-implemented method of any of examples 1-3, wherein the one or more attributes include one or more cost attributes, and wherein determining the ranking value for each of the plurality of candidate data sources comprises: determining a total cost based on the one or more cost attributes for each of the plurality of candidate data sources; and sorting the plurality of candidate data sources by the total cost.

Example 5. The computer-implemented method of any of example 1-4, wherein the one or more attributes include one or more user-input value attributes, each of the one or more user-input value attributes including a user-defined weight, and wherein determining the ranking value for each of the plurality of candidate data sources comprises: sorting the plurality of candidate sources by the one or more user-input value attributes.

Example 6. The computer-implemented method of any of examples 1-5, wherein the attributes include two or more user-input value attributes, and wherein determining the ranking value for each of the plurality of candidate data sources comprises: sorting the plurality of candidate sources by the user-input value attribute with a highest user-defined weight; and sorting the plurality of candidate sources by the user-input value attribute with a next highest user-defined weight.

Example 7. The computer-implemented method of any of examples 1-6, wherein the output list includes a predetermined number of candidate data sources, wherein the predetermined number of candidate data sources included in the output list are candidate data sources with highest ranking values.

Example 8. The computer-implemented method of any of examples 1-7, wherein the AI model comprises a plurality of AI agents performing operations in parallel, each of the AI agents including a cognitive model.

Example 9. The computer-implemented method of any of examples 1-8, wherein the one or more attributes include one or more of: binary attributes; cost attributes; or value attributes.

Example 10. The computer-implemented method of any of examples 1-9, further comprising: prior to routing the data request to the first candidate data source, updating, by the one or more processors, the data object in a format associated with the first candidate data source.

Example 11. A system comprising: memory configured to store instructions; and one or more processors configured to execute the instructions to perform operations comprising: receiving, from a user device, a user input including a data request associated with one or more data gaps, wherein the data request includes a data object including one or more entities and one or more attributes associated with each of the one or more entities; receiving an input list including a plurality of candidate data sources for the data request; determining, by an artificial intelligence (AI) model, a plurality of ranking values for the plurality of candidate data sources respectively based on the one or more attributes, each of the plurality of ranking values indicative of a likelihood of filling the one or more data gaps associated with the data request; sorting, by the AI model, the plurality of candidate data sources by the plurality of ranking values; in response to receiving the data request, transmitting, by the one or more processors and to the user device, an output list that includes the sorted plurality of candidate data sources; in response to receiving, from the user device, a response to the output list: routing the data request over a network to a first candidate data source of the plurality of candidate data sources based on a first ranking value of the plurality of ranking values; and blocking routing of the data request over the network to a second candidate data source of the plurality of candidate data sources based on a second ranking value of the plurality of ranking values, wherein the first ranking value is higher than the second ranking value.

Example 12. The system of example 11, wherein the one or more attributes include one or more binary attributes, and wherein determining the ranking value for each of the plurality of candidate data sources comprises: determining whether each of the plurality of candidate data sources includes an entry for each of the one or more binary attributes; and upon determining that at least one of the plurality of candidate data sources does not include an entry for each of the one or more binary attributes, filtering the at least one of the plurality of candidate data sources from the output list.

Example 13. The system of example 12, wherein determining the ranking value for each of the plurality of candidate data sources further comprises: upon determining that two or more of the plurality of candidate data sources include an entry for at least one of the one or more binary attributes, sorting the two or more of the plurality of candidate data sources by a total number of entries for at least one of the one or more binary attributes.

Example 14. The system of any of examples 11-13, wherein the one or more attributes include one or more cost attributes, and wherein determining the ranking value for each of the plurality of candidate data sources comprises: determining a total cost based on the one or more cost attributes for each of the plurality of candidate data sources; and sorting the plurality of candidate data sources by the total cost.

Example 15. The system of any of examples 11-14, wherein the attributes include one or more user-input value attributes, each of the one or more user-input value attributes including a user-defined weight, and wherein determining the ranking value for each of the plurality of candidate data sources comprises: sorting the plurality of candidate sources by the one or more user-input value attributes.

Example 16. The system of any of examples 11-15, wherein the attributes include two or more user-input value attributes, and wherein determining the ranking value for each of the plurality of candidate data sources comprises: sorting the plurality of candidate sources by the user-input value attribute with a highest user-defined weight; and sorting the plurality of candidate sources by the user-input value attribute with a next highest user-defined weight.

Example 17. The system of any of examples 11-16, wherein the output list includes a predetermined number of candidate data sources, wherein the predetermined number of candidate data sources included in the output list are candidate data sources with highest ranking values.

Example 18. The system of any of examples 11-17, wherein the one or more attributes include one or more of: binary attributes; cost attributes; or value attributes.

Example 19. The system of any of examples 11-18, the operations further comprising: prior to routing the data request to the first candidate data source, updating the data object in a format associated with the first candidate data source.

Example 20. A non-transitory computer-readable medium storing instructions that, when executed by one or more processors, cause the one or more processors to perform operations comprising: receiving, from a user device, a user input including a data request associated with one or more data gaps, wherein the data request includes a data object including one or more entities and one or more attributes associated with each of the one or more entities; receiving an input list including a plurality of candidate data sources for the data request; determining, by an artificial intelligence (AI) model, a plurality of ranking values for the plurality of candidate data sources respectively based on the one or more attributes, each of the plurality of ranking values indicative of a likelihood of filling the one or more data gaps associated with the data request; sorting, by the AI model, the plurality of candidate data sources by the plurality of ranking values; in response to receiving the data request, transmitting, by the one or more processors and to the user device, an output list that includes the sorted plurality of candidate data sources; in response to receiving, from the user device, a response to the output list: routing the data request over a network to a first candidate data source of the plurality of candidate data sources based on a first ranking value of the plurality of ranking values; and blocking routing of the data request over the network to a second candidate data source of the plurality of candidate data sources based on a second ranking value of the plurality of ranking values, wherein the first ranking value is higher than the second ranking value.

What is claimed is:

1. A computer-implemented method comprising:
    receiving, by one or more processors and from a user device, a user input including a data request associated with one or more data gaps, wherein the data request includes a data object including one or more entities and one or more attributes associated with each of the one or more entities;
    receiving, by the one or more processors, an input list including a plurality of candidate data sources for the data request;
    determining, by the one or more processors and an artificial intelligence (AI) model, a plurality of ranking values for the plurality of candidate data sources respectively based on the one or more attributes, each of the plurality of ranking values indicative of a likelihood of filling the one or more data gaps associated with the data request;
    sorting, by the one or more processors and the AI model, the plurality of candidate data sources by the plurality of ranking values;
    in response to receiving the data request, transmitting, by the one or more processors and to the user device, an output list that includes the sorted plurality of candidate data sources; and
    in response to receiving, by one or more processors and from the user device, a response to the output list:
        routing, by the one or more processors and over a network, the data request to a first candidate data source of the plurality of candidate data sources based on a first ranking value of the plurality of ranking values; and
        blocking, by the one or more processors, routing of the data request over the network to a second candidate data source of the plurality of candidate data sources based on a second ranking value of the plurality of ranking values, wherein the first ranking value is higher than the second ranking value.

2. The computer-implemented method of claim 1, wherein the one or more attributes include one or more binary attributes, and wherein determining the plurality of ranking values for the plurality of candidate data sources comprises:
    determining whether each of the plurality of candidate data sources includes an entry for each of the one or more binary attributes; and
    upon determining that at least one of the plurality of candidate data sources does not include an entry for each of the one or more binary attributes, filtering the at least one of the plurality of candidate data sources from the output list.

3. The computer-implemented method of claim 2, wherein determining the plurality of ranking values for the plurality of candidate data sources further comprises:
    upon determining that two or more of the plurality of candidate data sources include an entry for at least one of the one or more binary attributes, sorting the two or more of the plurality of candidate data sources by a total number of entries for at least one of the one or more binary attributes.

4. The computer-implemented method of claim 1, wherein the one or more attributes include one or more cost attributes, and wherein determining the plurality of ranking values for the plurality of candidate data sources comprises:
    determining a total cost based on the one or more cost attributes for each of the plurality of candidate data sources; and
    sorting the plurality of candidate data sources by the total cost.

5. The computer-implemented method of claim 1, wherein the one or more attributes include one or more user-input value attributes, each of the one or more user-input value attributes including a user-defined weight, and wherein determining the plurality of ranking values for the plurality of candidate data sources comprises:
   sorting the plurality of candidate sources by the one or more user-input value attributes.

6. The computer-implemented method of claim 1, wherein the one or more attributes include two or more user-input value attributes, and wherein determining the plurality of ranking values for the plurality of candidate data sources comprises:
   sorting the plurality of candidate sources by a user-input value attribute of the two or more user-input value attributes with a highest user-defined weight; and
   sorting the plurality of candidate sources by a user-input value attribute of the two or more user-input value attributes with a next highest user-defined weight.

7. The computer-implemented method of claim 1, wherein the output list includes a predetermined number of the plurality of candidate data sources, wherein the predetermined number of the plurality of candidate data sources included in the output list are ones of the plurality of candidate data sources with highest ranking values.

8. The computer-implemented method of claim 1, wherein the AI model comprises a plurality of AI agents performing operations in parallel, each of the plurality of AI agents including a cognitive model.

9. The computer-implemented method of claim 1, wherein the one or more attributes include one or more of:
   binary attributes;
   cost attributes; or
   value attributes.

10. The computer-implemented method of claim 1, further comprising:
    prior to routing the data request to the first candidate data source, updating, by the one or more processors, the data object in a format associated with the first candidate data source.

11. A system comprising:
    memory configured to store instructions; and
    one or more processors configured to execute the instructions to perform operations comprising:
       receiving, from a user device, a user input including a data request associated with one or more data gaps, wherein the data request includes a data object including one or more entities and one or more attributes associated with each of the one or more entities;
       receiving an input list including a plurality of candidate data sources for the data request;
       determining, by an artificial intelligence (AI) model, a plurality of ranking values for the plurality of candidate data sources respectively based on the one or more attributes, each of the plurality of ranking values indicative of a likelihood of filling the one or more data gaps associated with the data request;
       sorting, by the AI model, the plurality of candidate data sources by the plurality of ranking values;
       in response to receiving the data request, transmitting, by the one or more processors and to the user device, an output list that includes the sorted plurality of candidate data sources; and
       in response to receiving, from the user device, a response to the output list:
          routing the data request over a network to a first candidate data source of the plurality of candidate data sources based on a first ranking value of the plurality of ranking values; and
          blocking routing of the data request over the network to a second candidate data source of the plurality of candidate data sources based on a second ranking value of the plurality of ranking values, wherein the first ranking value is higher than the second ranking value.

12. The system of claim 11, wherein the one or more attributes include one or more binary attributes, and wherein determining the plurality of ranking values for the plurality of candidate data sources comprises:
    determining whether each of the plurality of candidate data sources includes an entry for each of the one or more binary attributes; and
    upon determining that at least one of the plurality of candidate data sources does not include an entry for each of the one or more binary attributes, filtering the at least one of the plurality of candidate data sources from the output list.

13. The system of claim 12, wherein determining the plurality of ranking values for the plurality of candidate data sources further comprises:
    upon determining that two or more of the plurality of candidate data sources include an entry for at least one of the one or more binary attributes, sorting the two or more of the plurality of candidate data sources by a total number of entries for at least one of the one or more binary attributes.

14. The system of claim 11, wherein the one or more attributes include one or more cost attributes, and wherein determining the plurality of ranking values for the plurality of candidate data sources comprises:
    determining a total cost based on the one or more cost attributes for each of the plurality of candidate data sources; and
    sorting the plurality of candidate data sources by the total cost.

15. The system of claim 11, wherein the one or more attributes include one or more user-input value attributes, each of the one or more user-input value attributes including a user-defined weight, and wherein determining the plurality of ranking values for the plurality of candidate data sources comprises:
    sorting the plurality of candidate sources by the one or more user-input value attributes.

16. The system of claim 11, wherein the one or more attributes include two or more user-input value attributes, and wherein determining the plurality of ranking values for the plurality of candidate data sources comprises:
    sorting the plurality of candidate sources by a user-input value attribute of the two or more user-input value attributes with a highest user-defined weight; and
    sorting the plurality of candidate sources by a user-input value attribute of the two or more user-input value attributes with a next highest user-defined weight.

17. The system of claim 11, wherein the output list includes a predetermined number of the plurality of candidate data sources, wherein the predetermined number of the plurality of candidate data sources included in the output list are ones of the plurality of candidate data sources with highest ranking values.

18. The system of claim 11, wherein the one or more attributes include one or more of:
- binary attributes;
- cost attributes; or
- value attributes.

19. The system of claim 11, the operations further comprising:
- prior to routing the data request to the first candidate data source, updating the data object in a format associated with the first candidate data source.

20. At least one non-transitory computer-readable medium storing instructions that, when executed by one or more processors, cause the one or more processors to perform operations comprising:
- receiving, from a user device, a user input including a data request associated with one or more data gaps, wherein the data request includes a data object including one or more entities and one or more attributes associated with each of the one or more entities;
- receiving an input list including a plurality of candidate data sources for the data request;
- determining, by an artificial intelligence (AI) model, a plurality of ranking values for the plurality of candidate data sources respectively based on the one or more attributes, each of the plurality of ranking values indicative of a likelihood of filling the one or more data gaps associated with the data request;
- sorting, by the AI model, the plurality of candidate data sources by the plurality of ranking values;
- in response to receiving the data request, transmitting, by the one or more processors and to the user device, an output list that includes the sorted plurality of candidate data sources; and
- in response to receiving, from the user device, a response to the output list:
  - routing the data request over a network to a first candidate data source of the plurality of candidate data sources based on a first ranking value of the plurality of ranking values; and
  - blocking routing of the data request over the network to a second candidate data source of the plurality of candidate data sources based on a second ranking value of the plurality of ranking values, wherein the first ranking value is higher than the second ranking value.

\* \* \* \* \*